Figure 1:
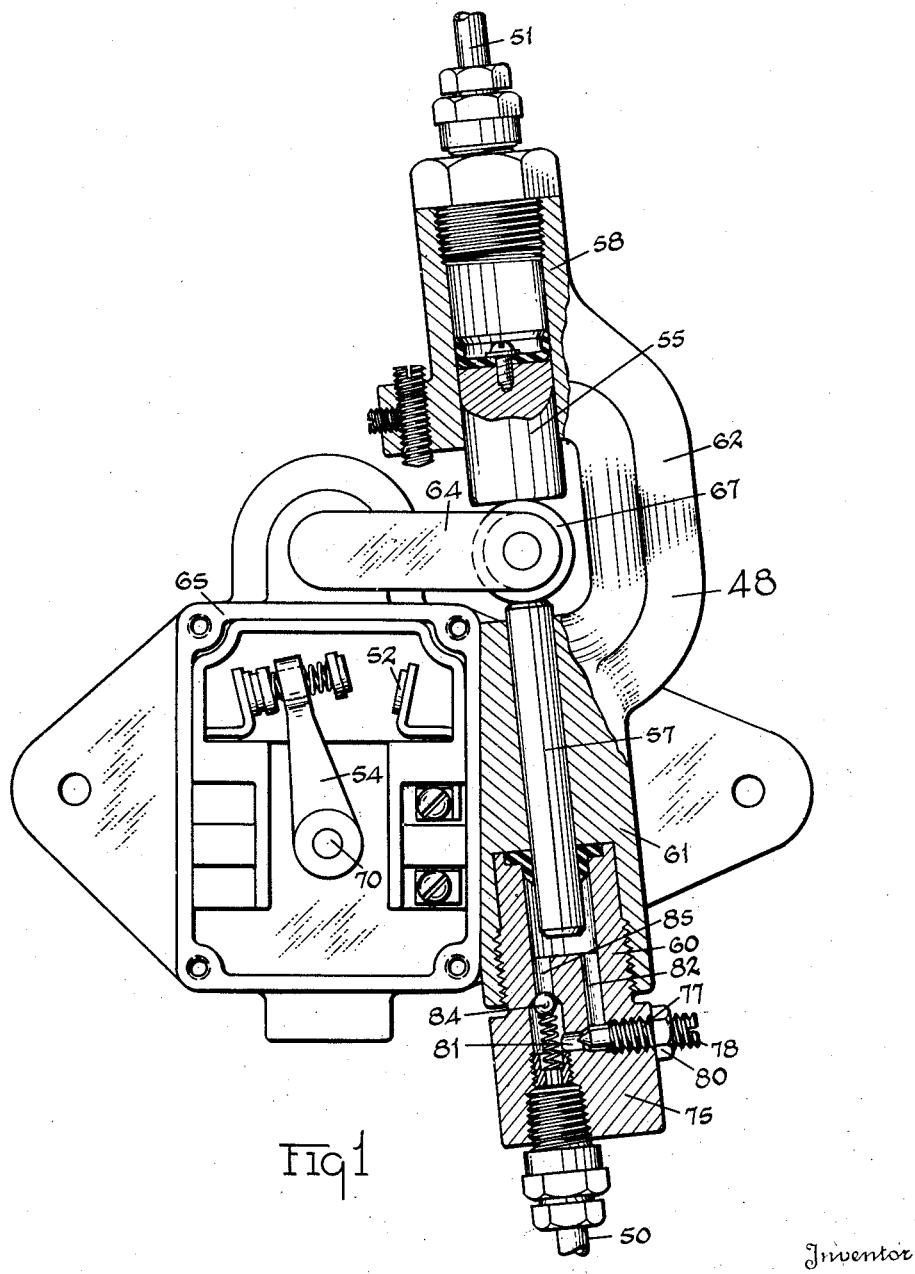

July 22, 1941.　　　F. H. JOHNSON　　　2,250,302
WELDER CURRENT CONTROL SWITCH
Filed July 20, 1939　　　2 Sheets-Sheet 1

Inventor
Frederick H. Johnson
By
Attorney

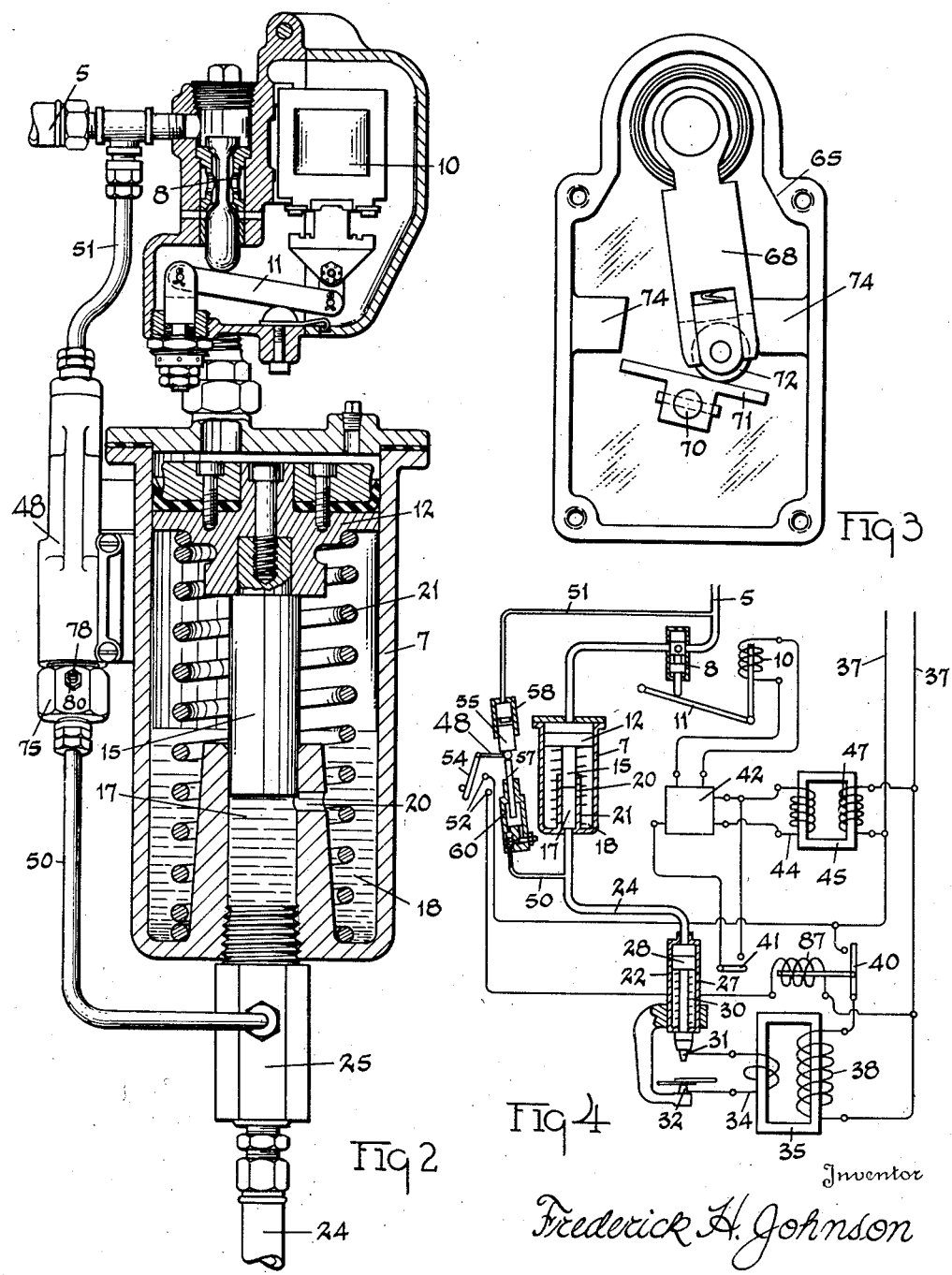

Patented July 22, 1941

2,250,302

UNITED STATES PATENT OFFICE 2,250,302

WELDER CURRENT-CONTROL SWITCH

Frederick H. Johnson, Ferndale, Mich.

Application July 20, 1939, Serial No. 285,543

1 Claim. (Cl. 200—82)

My invention has for its object to provide a pressure switch that is, particularly, adapted for closing the circuit of a main contactor switch to cause the flow of the welding current through the electrodes of spot welders and which is operated by the fluid pressure when the required welding pressure is produced by the welding electrodes. As is well known in connection with spot welders that are operated by fluid pressure, a source of supply of pressed fluid is connected through a flexible pipe to enable manipulation of the electrodes with respect to the work and a fluctuating pressure is caused by the impact of the electrode when it strikes the work and the elasticity of the tubes and a corresponding momentary reduction of pressure of the fluid at the point at which the pressure switch communicates with the passage leading from the source of supply of pressure to the welder, which frequently causes opening of the switch and a subsequent closure by the following rise in pressure. This is, also, due, in part, to the elastic means that is commonly used to cause the return of the welder piston, that reacts with the rebound produced by the impact of the welder electrodes against the work. It is, also, due, in part, to the flexible tube that connects the welder with the source of supply, which produces a sudden expansion of the tube, the instant that the welder electrodes are brought against the work, and reacts to cause, by the elasticity of the wall of the tube, a contractual movement and a back wave of pressure toward the source of supply.

The invention is of particular advantage where the welder is operated by a high fluid pressure, such as where the welder is operated hydraulically by air pressure through the medium of a booster, since, the liquid, through which the pressure is transmitted, responds quite in accordance with any fluctuation of pressure that occurs in the operating cylinder of the welder.

The invention may be contained in structures of different forms and to illustrate a practical application of the invention, I have selected a welder current-control switch as an example of structures embodying the invention and shall describe the welder current-control switch hereinafter, it being understood that it may be varied in its details without departing from the invention, as presented in the claim hereinafter appended. The welder switch and its particular application to a welder apparatus is shown in the accompanying drawings.

Fig. 1 illustrates a side view, partly in section, of the welder current-control switch. Fig. 2 illustrates the switch attached to a booster for transforming pneumatic pressure to a higher hydraulic pressure. Fig. 3 illustrates one of the elements of the switch, through which the actuating pressures are transmitted to cause movement of the switch. Fig. 4 illustrates a diagram of the apparatus, in which the switch is used for controlling the flow of the welding current to the electrodes of the welder.

The welder switch, shown in the figures of the drawings, is connected to both the pneumatic and hydraulic parts of the apparatus. The welding apparatus has a pipe 5 that is connected to a source of supply of air under pressure. A booster 7 is connected to the pipe 5 through a suitable electromagnetically-operated valve 8. The valve 8 is operated by a lever 11 that is actuated by a solenoid 10 to admit air under pressure to the booster. The booster has a piston part 12 that has a considerable area and, consequently, is moved with a considerable force. A piston part 15 is connected to the piston part 12 and moves in a cylinder 17. The diameter of the piston part 15 is considerably smaller than the diameter of the piston part 12. Also, the booster 7 is provided with a reservoir 18 for containing oil and the cylinder 17 is provided with an opening 20 located at a point beneath the level of the oil in the reservoir and at a point such that it is uncovered by the piston part 15 upon the completion of its return movement which admits oil into the cylinder 17 and the passages that communicate with the lower end of the cylinder. The piston parts 12 and 15 are moved by a spring 21, when the pressure on the piston part 12 is released by the operation of the valve 8 to return the piston parts.

A welder 22 is connected by a flexible pipe 24 and a pipe connector 25 with the cylinder 17 of the booster. The welder is provided with a cylinder 27 and a piston 28 and is operated by the pressure that is transmitted hydraulically through the flexible pipe 24 and counter to the spring 30. The spring 30 causes the return of the piston 28 when the pressure on the piston part 12 of the booster is released by the operation of the valve 8. The welder electrode 31 is mechanically connected to the piston 28 while the other electrode 32 is mechanically connected to the body of the welder, such as to the cylinder 27. The electrodes are electrically connected to the secondary 34 of the transformer 35. A source of electric current is connected to the apparatus through a pair of main lines 37 and the primary 38 of the transformer 35 is connected to the main lines 37 by means of a contactor switch 40 for completing the circuit of the primary 38 which, when closed, operates to produce the flow of a welding current through the electrodes 31 and 32.

The welder apparatus is initiated by the manual operation of a switch 41, commonly mounted on the welder and convenient for its operation. Preferably, the pressure period and the period of flow of the welding current is controlled by a timer, such as the timer switch 42, that controls the operation of the valve 8, which, in turn, controls the contactor switch 40. The switch 41 and the timer switch 42 and the solenoid 10 are connected to the secondary 44 of a transformer 45 having a primary 47, which is connected to the main lines 37 through a suitable main-line switch. When the switch 41 is closed, the time-controlling operation of the timer switch 42 is initiated and the valve 8 is operated to connect the booster 7 with the source of supply of air under pressure and the connection of the booster with the source of supply of air under pressure is maintained for a definite period according to the setting of the timer switch 42. Thus, the switch 41 may be operated for an adjusted time interval and the pressure on the booster will be released at the expiration of a predetermined time.

The pressure welder current-control switch 48 is connected by a pipe 50 to the connector 25, which communicates with the passage extending from the booster to the welder and is, also, connected to the pipe 51, and, upon the operation of the booster 7 and the rise of the pressure within the flexible pipe 24 and the connector 25, pressure will be transmitted to the switch 48 counter to the pneumatic pressure, which is constantly maintained in the pipe 51.

The switch 48 is provided with one or more electric contacts 52 and the circuit of the switch is completed by means of the movable contact arm 54 that is actuated by the pressure differential existing between the pressures that are exerted on the pistons 55 and 57 slidably supported with respect to the cylinder 58 and 60. The cylinder 60 of the switch 48 is connected to the pipe 50 for hydraulically operating the piston 57, while the cylinder 58 is connected with the pipe 5 by means of the pipe 51 to pneumatically operate the piston 55, which is pressed in a direction counter to that in which the piston 57 is moved by the hydraulic pressure. The switch 48 has a base part 61 that may be secured to any suitable support, such as to the side wall of the booster 7, by means of suitable screws. The base part 61 is provided with an arm 62. The end of the arm has an enlargement from which the cylinder 58 is formed. The cylinder 60 is located in the base part 61. Preferably, the base part 61 is bored and tapped, while the cylinder 60 is externally threaded and may be secured in the base part 61 by rotation. The piston 57 is in the form of a pin, having a relatively small diameter, that protrudes into the cylinder 60, while the piston 55 is considerably larger in diameter and protrudes from the cylinder 58 toward the outer end of the piston 57 and is located in axial alignment therewith. The ratio of the area of the piston 55 to the area of the piston 57 is less than the ratio of the piston part 12 to the piston part 15.

The proximate ends of the pistons are spaced from each other to engage a switch-operating member. An arm 64, pivotally supported in the switch box 65, is provided with a roller 67 that is disposed intermediate the ends of the pistons 55 and 57 and so as to be engaged thereby and moved according to the difference in pressures that are produced in the cylinders 58 and 60. The movements of the arm 64 are translated to the movable contact arm 54 by means of an arm 68 that is connected to the arm 64. The arm 54 is pivotally supported on a shaft 70. A plate 71 is, also, connected to the shaft 70 and the arm 68 has a spring-pressed roller 72, which, in its oscillatory movements, as produced by the operations of the pistons 55 and 57, moves over the plate 71 as limited by the stops 74 located on opposite sides of the arm 68 from one side of the line of the centers of the arms 64 and 68 to the axis of movement of the arms 64 and 68 to cause tilting movements of the plate 71 and the corresponding oscillatory movements of the contact arm 54 to open and close the contactor switch 40.

To prevent opening and closing of the contactor switch 40 by the pulsation following initial transmission of the hydraulic pressure to the welder caused by the recoil of the elastic parts following the impact of the electrodes with the work, the cylinder head 75 of the cylinder 60 is provided with a needle valve 77 that may be adjustably secured in position. The needle valve is provided with a threaded end portion 78 and the head 75 is tapped to receive the needle valve and to adjustably locate the needle valve with respect to its seat. The valve may be secured in its adjusted position by means of the nut 80. The transmission of pressure from the passage leading through the connector 25 and through the passages 81 and 82 to the interior of the cylinder 60 may, thus, be regulated. Also, the inflow into the cylinder 60 during the rise in pressure may be adjustably delayed. The head 75 is, also, provided with a one-way valve 84 comprising a spring-pressed ball, which is located in a passage 85 to permit substantially free return of the fluid from the cylinder 60 through the pipe 50.

Preferably, the piston areas of the pistons 55 and 57 of the switch 48 have a definite ratio with respect to the ratio of the piston areas of the piston parts 12 and 15 of the booster 7, to prevent operation of the switch 48 until the pressure rises within the cylinder 60 above a predetermined point with respect to that which is producible in the cylinder of the welder by the operation of the booster and, thus, the flow of welding current is delayed until after permanency of the required welding pressure is established.

The needle valve 78 may be adjusted to extend the interim between the operation of the piston parts 12 and 15 of the booster 7 and the rise in pressure in the cylinder 60 sufficient to overcome pressure of the larger piston 55 that is pneumatically operated by the pressure of the source of supply of fluid under pressure, to insure a pressure period in advance of the flow of the welding current, which gives opportunity for shaping of the metal and forcing metal parts into contact with each other if required, in advance of the weld, such as frequently occurs where there is any local buckling of one of the parts of the work relative to the other of the parts of the work.

The solenoid 87 of the contactor switch 40 is connected to one of the main lines 37 and the arm 54 operates to complete the circuit of the solenoid 87 to the other of the main lines 37 to complete the circuit of the primary 38 which causes the flow of the welding current between the electrodes 31 and 32. Upon the expiration of the pressure period, as determined by the timer switch 42, which controls the valve 8, the pressure within the connector 25 is reduced and the fluid is allowed to immediately return from the cylinder 60 through the one-way valve 84 and the pipe 50, which produces immediate release of the pressure on the piston 57 and by the operation of the piston 55, the switch 43 is opened and the contactor switch 40 is, likewise, opened to cause cessation of the flow of the welding current well in advance of the release of the electrodes from the work.

I claim:

In a fluid-pressure, current-control means; a source of supply of fluid under pressure, a converter connected to the source for producing a unit of area pressure higher than that produced by the said source; a pair of cylinders, one connected to the said source and the other connected to the converter to receive the fluid pressure produced by the converter; a pair of pistons located in the said cylinders and movable in response to the pressure of the said cylinders; a switch; means for connecting the switch to the pistons to actuate the switch according to the difference of pressures produced by the pistons in response to the pressures existing in their associated cylinders; restricted passageway for delaying the transmission of pressure to the said other cylinder from the converter; means for releasing the pressure in the said other cylinder upon release of pressure produced by the converter; and means for returning the pistons and opening the switch upon release of the pressure produced by the converter.

FREDERICK H. JOHNSON.